(12) United States Patent
Saitoh

(10) Patent No.: US 7,965,071 B2
(45) Date of Patent: Jun. 21, 2011

(54) DC-DC BOOST CONVERTER

(75) Inventor: Mitsuyori Saitoh, Tokyo (JP)

(73) Assignee: Texas Instruments Incorporated, Dallas, TX (US)

( * ) Notice: Subject to any disclaimer, the term of this patent is extended or adjusted under 35 U.S.C. 154(b) by 248 days.

(21) Appl. No.: 12/391,005

(22) Filed: Feb. 23, 2009

(65) Prior Publication Data

US 2009/0237051 A1 Sep. 24, 2009

(30) Foreign Application Priority Data

Feb. 21, 2008 (JP) ................. 2008-039920

(51) Int. Cl.
*G05F 1/10* (2006.01)
*G05F 1/40* (2006.01)
(52) U.S. Cl. ........................... 323/288; 323/222
(58) Field of Classification Search .......... 323/222–225, 323/268, 271, 282–285, 288
See application file for complete search history.

(56) References Cited

U.S. PATENT DOCUMENTS

| 6,229,293 | B1 * | 5/2001 | Farrenkopf | 323/288 |
| 6,897,640 | B2 * | 5/2005 | Nebon et al. | 323/282 |
| 7,595,623 | B2 * | 9/2009 | Bennett | 323/288 |
| 7,843,178 | B1 * | 11/2010 | Houk et al. | 323/222 |
| 2008/0224681 | A1 * | 9/2008 | Padure et al. | 323/288 |

* cited by examiner

*Primary Examiner* — Matthew V Nguyen
(74) *Attorney, Agent, or Firm* — John J. Patti; Wade J. Brady, III; Frederick J. Telecky, Jr.

(57) ABSTRACT

A DC-DC boost converter is provided that generally maintains discontinuous mode operation in a generally efficient manner. To accomplish this, a clamp generator, comparator, logic gates, a flip-flop, and counter are employed. These components generally operate together to determine if an over-limit condition has taken place, so that the ON time of the boost converters' switch can be varied accordingly.

14 Claims, 8 Drawing Sheets

DC-DC BOOST CONVERTER

This patent application claims priority from Japanese Patent Application No. 2008-039920, filed 21 Feb. 2008, the entirety of which is incorporated herein by reference.

FIELD OF THE INVENTION

The present invention pertains to a DC-DC converter that converts input DC (direct-current) power to arbitrary DC (direct-current) power, and relates in particular to a DC-DC boost converter with which a high output voltage can be obtained from the input voltage.

BACKGROUND OF THE INVENTION

DC-DC converters are small, lightweight, high-efficiency direct-current power sources that use semiconductor switching elements. They are widely used for electronic equipment and the like, and in recent years, the demand for small, lightweight and high-efficiency converters has increased. The basic principal of a DC-DC converter is to turn a switching element on and off at high frequency, variably control the On/OFF period ratio, that is, the duty ratio, and keep the direct-current output voltage at a constant level. Types with which a high output voltage is obtained from the input voltage with a so-called non-insulated or chopper system are called DC-DC boost converters or boosters.

A conventional, representative DC-DC boost converter (booster) is shown in FIG. 5. This booster, broadly categorizing, is constituted with two parts: booster core 100 and control 102.

Booster core 100 is comprised of an inductor 104, NMOS transistor 106, diode 108 and output capacitor 110. More specifically, inductor 104 and NMOS transistor 106 are connected in series through node N between an input terminal, to which direct-current input voltage $V_I$ is input, and a ground potential terminal, diode 108 is connected between node N and output terminal 112, and output capacitor 110 is connected between output terminal 112 and a ground potential terminal.

Control 102 is comprised of reference voltage generation circuit 114, error amplifier 116, integrator 118, clamp voltage generation circuit 120, ramp (sawtooth or triangular wave) generation circuit 122, comparators 124 and 126, logic gate circuit (AND gate) 128, and gate drive circuit 130. More specifically, reference voltage generation circuit 114 generates reference voltage $V_{REF}$ at a constant voltage level and supplies it to one input terminal (+) of error amplifier 116. Output voltage $V_O$ is input from booster core 100 to the other terminal (−) of error amplifier 116. Error amplifier 116 takes the difference or error between the two voltages $V_O$ and $V_{REF}$, and outputs an output voltage according to the error as error signal $V_e$. Error signal $V_E$ is time-integrated by integrator 118, and is supplied to one input terminal (+) of comparator 124 as integrated error signal $V_{ES}$.

Ramp voltage, for example, sawtooth wave $V_{RAMP}$, synchronized with clock CLK is supplied from ramp-generation circuit 122 to the other terminal (−) of comparator 124. Comparator 124 compares the voltage levels of the two input signals $V_{RAMP}$ and $V_{ES}$, and outputs a binary signal or pulse at H level when $V_{RAMP}<V_{ES}$, and at L level when $V_{ramp}>V_{es}$, as pulse width control signal or PWM control signal $V_{PWM}$. The PWM control signal $V_{PWM}$ is sent to one of the input terminals of AND circuit 128.

Sawtooth wave $V_{RAMP}$ output from ramp-generation circuit 122 is also supplied to one input terminal (−) of the other comparator 126. Clamp voltage $V_{CLAMP}$ with a constant voltage level is input from clamp voltage generation circuit 120 to the other input terminal (+) of comparator 126. Comparator 126 compares the voltage levels of the two input signals $V_{RAMP}$ and $V_{CLAMP}$, and outputs a binary signal or pulse at H level when $V_{RAMP}<V_{CLAMP}$, and one at L level when $V_{RAMP}>V_{CLAMP}$, as ON period upper limit signal $V_{LIMIT}$. ON period upper limit signal $V_{LIMIT}$ is supplied to the other input terminal of AND circuit 128.

AND circuit 128 outputs, as switching drive signal $V_{DRIVE}$, a binary signal or pulse which is at H level when both input signals $V_{PWM}$ and $V_{LIMIT}$ are at H level, and is at L level when one or both are at L level. Here, because both input signals $V_{PWM}$ and $V_{LIMIT}$ are synchronized with clock CLK, switching drive signal $V_{DRIVE}$ is also synchronized with clock CLK. Gate drive circuit 130 outputs gate voltage $V_G$ in response to switching drive signal $V_{DRIVE}$ from AND circuit 128, and NMOS transistor 106 of core part 100 is switched.

In booster core 100, the ON period is when gate voltage $V_G$ is at H level. During this period, NMOS transistor 106 is on, and inductance current $I_L$ flows to the ground potential terminal through inductor 104 and NMOS transistor 106 from the voltage input terminal, and is stored in inductor 104. The ON period is when gate voltage $V_G$ is at L level. During this period, NMOS transistor 106 is off, and electromagnetic energy stored in inductor 104 prior to that is discharged toward output capacitor 110. That is, inductance current $I_L$ from inductor 104 flows into output capacitor 110 through node N and diode 108, and output capacitor 110 is charged.

The basic operation of the booster is shown in FIG. 6. As illustrated, gate voltage $V_G$, inductance current $I_L$ and the potential $V_L$ of node N are all synchronized with clock CLK that has constant cycle $T_S$.

That is, gate voltage $V_G$ rises to H level from the prior L level at the start of each cycle of clock CLK, and NMOS transistor 106 comes on. During the period when gate voltage $V_G$ maintains the H level and NMOS transistor is on (ON period), inductance current $I_L$ increases with slope $V_I/L$ (L is the inductance of inductor 104). At this time, potential $V_L$ of node N is at ground potential (zero volts).

Then, during the relevant cycle, when gate voltage $V_G$ changes from H level to L level, NMOS transistor 106 goes off, switching from the ON period to the OFF period. Then when node N is disconnected from the ground potential, and assuming that the voltage drop from diode 108 is ideally zero, potential $V_L$ of node N rises to a level equal to output voltage $V_O$, and the destination of inductance current $I_L$ is switched to output capacitor 110 from the prior ground potential terminal destination. Here, inductance current $I_L$ decreases at a slope of $(V_O-V_I)/L$.

Then, when inductance current $I_L$ has decreased to zero amperes and there is no flow, at that instant, potential $V_L$ of node N changes to a level equal to input voltage $V_I$ (potential of the voltage input terminal) from a level approximately equal to output voltage $V_O$ prior to that, and this non-current state is maintained until the end of the OFF period or cycle concerned.

When the next cycle of clock CLK begins, gate voltage $V_G$ again rises to H level from the L level prior to that, and the operation described above is repeated. However, because feedback-type PWM control is performed in control 102, the ratio of the ON period and the OFF periods, that is, the duty ratio, is changed for every cycle. FIG. 6 shows where inductance current $I_L$ has returned to zero amperes and is interrupted (called "discontinuous mode" hereafter).

FIG. 7 shows where inductance current $I_L$ in each cycle continues to flow, without returning to zero amperes, until the next cycle starts (called "continuous mode" hereafter). Such a continuous mode is reached when the On duty period is made longer.

It is generally considered that a transfer function of the booster core 100 in the discontinuous mode can be approximated as a primary pole system, and its operation is stable. On the other hand, a transfer function in the continuous mode not only operates as a secondary pole system, but has an RHP (right half-plane) zero point, and compensation for this is complicated and difficult. Therefore, stable operation and simplification of the circuit configuration are achieved by its configuration as a booster that will normally operate in discontinuous mode.

Here, when the duty for the period when NMOS transistor 106 is on is $D_1$, and the duty for the period after NMOS transistor 106 switches to off from on until inductance current $I_L$ reaches zero amperes is $D_2$, relative to cycle $T_S$ of clock CLK, duties $D_1$ and $D_2$ are represented with the following formulas based on input voltage $V_I$, output voltage $V_O$, inductor 104 inductance L and load current $I_o$:

$$D_1 = \sqrt{\frac{(V_o - V_i)I_o}{V_i^2} \frac{2L}{T_S}} \qquad (1)$$

$$= \sqrt{\frac{2L}{R_o T_S}\left[\left(\frac{V_o}{V_i}\right)^2 - \frac{V_o}{V_i}\right]}, \text{ where } R_O = V_O/I_O$$

$$D_2 = \frac{V_i}{V_o - V_i} D_1 \qquad (2)$$

Pertaining to ON duty $D_1$, the condition to maintain a discontinuous mode is that $D_1$ be smaller than ON duty D in a continuous mode, so it is stipulated by following equation (3).

$$D_1 < D = 1 - \frac{V_i}{V_o} \qquad (3)$$

In the booster in FIG. 5, the ON period within each cycle is primarily influenced by PWM control signal $V_{PWM}$ output from comparator 124, and is ultimately determined by the logical product (AND condition) of PWM control signal $V_{PWM}$ and ON period upper limit signal $V_{LIMIT}$ output from comparator 126. That is, the pulse width of PWM control signal $V_{PWM}$ is subject to the restriction on the pulse width of ON period upper limit signal $V_{LIMIT}$, that is, the ON period upper limit, through AND circuit 128, so that the pulse width (ON period) of switching drive signal $V_{drive}$ will not exceed the ON period upper limit.

Therefore, from equation (3) above, by setting the ON period upper limit stipulated by ON period upper limit signal $V_{LIMIT}$ to $\{1-(V_I/V_O)\} \cdot V_S$ (where $V_S$ is the peak value of sawtooth wave $V_{RAMP}$), discontinuous mode operation can be realized wherein shifting to a continuous mode is restricted. In this case, duty $D_C$ of ON period upper limit signal $V_{LIMIT}$ is represented with equation (4) below.

$$D_C = \frac{V_{CLAMP}}{V_S} \qquad (4)$$

An example of operation when load current $I_O$ varies in the increasing direction above a steady value over a certain period $T_A$ in the booster in FIG. 5 is shown in FIG. 8 with the waveforms of various parts.

As shown in FIG. 8, when load current $I_O$ varies in the increasing direction, output voltage $V_O$ becomes lower than reference voltage $V_{REF}$, the voltage level of error signal $V_{ES}$ rises because of this, the pulse width (H level period) of PWM control signal $V_{PWM}$ becomes larger, and the period for which NMOS transistor 106 is on (ON period) becomes longer. When the ON period becomes longer, inductance current $I_L$ increases, more energy is supplied to output capacitor 110 from inductor 104, and output voltage $V_O$ rises toward reference voltage $V_{REF}$.

Then when output voltage $V_O$ rises and exceeds reference voltage $V_{REF}$, the length of time during which NMOS transistor 106 is on (ON period) becomes shorter, the energy supplied to output capacitor 110 from inductor 104 decreases, and output voltage $V_O$ drops toward reference voltage $V_{REF}$.

In this feedback-type PWM control, when the pulse width of PWM control signal $V_{PWM}$ exceeds pulse width $T_S \cdot D_C$ of ON period upper limit signal $V_{LIMIT}$, it is subject to the upper limit restriction, and the pulse width of ON period upper limit signal $V_{LIMIT}$, and then the ON period (ON period) of NMOS transistor 106 becomes $T_S \cdot D_C$ in order not to exceed it, that is, in order not to shift to continuous mode operation from discontinuous mode operation.

In a conventional booster as described above, if each of the elements that constitute booster core 100 has the ideal characteristics, the conditions in equations (3) and (4) above are effective in restricting a shift to a continuous mode and for realizing normal discontinuous mode operation. In actuality, however, duty $D_C$ for the required ON period changes due to parasitic components in inductor 104, NMOS transistor 106, diode 108 and output capacitor 110, so the conditions above are not sufficient.

Also, in applications where input voltage $V_I$ or output voltage $V_O$ is variable, when the effects of ambient temperature or process fluctuation are taken into account, setting duty $D_C$ for the ON period upper limit uniquely, as with the conventional duty control method described above, is not appropriate. For example, while it is possible to set $D_C$ to a smaller value beforehand, there is the risk that excessive restriction will diminish the load characteristics of output voltage $V_O$ or the responsiveness to sudden load changes. On the other hand, when $D_C$ is set to a larger value, the possibility of the operating mode shifting from discontinuous mode operation to continuous mode operation becomes greater, and there is the risk that the stability of booster operation will be diminished.

An example of shifting to continuous operating mode from discontinuous operating mode with an abrupt load change and the output voltage becoming unstable in the booster in FIG. 5 is shown with simulated waveforms in FIG. 9.

In FIG. 9, when load current $I_o$ is changed from 1 mA (milliamperes) to 29 mA at T=5 ms, output voltage $V_o$ starts to drop, but output (error signal) $V_{es}$ of error amplifier 116 begins to rise. Along with this, the pulse width of PWM control signal $V_{pwm}$ becomes larger, and inductance current $I_L$ also gradually increases.

From T=5 ms to 5.05 ms, inductance current $I_L$ returns to zero (where $I_L$=0 A) at each cycle or switching cycle and operation is in discontinuous mode. After T=5.05 ms, however, rather than returning to $I_L$=0 A in each cycle, there is a shift to continuous mode. With the shift to continuous mode, booster operation becomes unstable, and low-frequency fluctuation (ringing) appears in output voltage $V_o$.

In recent years, applications using source voltage boosted from a single lithium battery, such as light-emitting diodes (LED) mounted in portable electronic equipment, or liquid crystal displays (LCD), have increased. With such applications, many of the boosters that are used operate in discontinuous mode where load current is not that large, from several mA to around 20 mA. For the output voltage of this type of booster, stability with little AC fluctuation, rather than DC or absolute value accuracy, is generally considered important.

The present invention was devised taking into consideration the problems in the prior art as described above, with the objective of providing a DC-DC boost converter (booster) that is not subject to the effects of the usage environment or variation in circuit elements, and with which discontinuous mode operation can be maintained efficiently without generally diminishing load characteristics or responsiveness.

SUMMARY OF THE INVENTION

In accordance with a preferred embodiment of the present invention, DC-DC boost converter of the invention has: an inductance element, a switching element connected in series with the inductance element through a node between an input terminal to which direct-current voltage is input and a reference potential terminal, a rectifying element connected between the node and an output terminal, an output capacitor connected between the output terminal and a reference potential terminal, a switching control circuit that divides each cycle regulated by a main clock with a constant frequency into 2 parts, that is, variable ON period and OFF period, and that turns the switching element on during the ON period and turns the switching element off during the OFF period, a current-monitoring circuit that monitors whether current is still flowing toward the output capacitor from the inductance element at the end of each cycle, and an ON period upper limit control circuit that restricts the ON period to no more than a predetermined upper limit for each cycle, and variably controls the upper limit of the ON period in the next cycle according to the monitoring result produced by the current-monitoring circuit.

The switching control circuit is turned on and off at a variable duty so that the voltage of the output capacitor, that is, the output voltage, will match a desired reference voltage. During this process the current-monitoring circuit monitors whether current is flowing from the inductance element toward the output capacitor at the end of each switching cycle. If no current is flowing, operation is determined to be in discontinuous mode, and if current is still flowing, operation is determined to be in continuous mode. The ON period upper limit control circuit variably controls the upper limit of the ON period in each cycle according to the monitoring result produced by the current-monitoring circuit. In particular, when a monitoring result from the current-monitoring circuit indicates that current is still flowing at the end of the cycle concerned, the upper limit of the ON period in the next cycle can be made lower, and a shift to continuous mode can be prevented in this way, or a return to discontinuous mode from continuous mode can be accomplished promptly.

In a preferred embodiment of the present invention, the current-monitoring circuit has a first comparator that compares the potential of the node and the potential of the output terminal and outputs a binary signal indicating the size relationship between the two potentials, and a judgment circuit that judges that current is still flowing when the potential of the node is higher than the potential of the output terminal at the end of each cycle, and judges that the current is not flowing when the potential of the node is lower than the potential of the output terminal. In this case, it is even more preferable for the current-monitoring circuit to also have a latch circuit that, at the end of each cycle regulated by the main clock, fetches the output signal of the first comparator in response to the rising edge or falling edge of a secondary clock, which has the same frequency as the main clock. The rising edge or falling edge of the main clock would be set to within the period of the final 10% of each cycle regulated by the main clock, and could also be variably adjusted within that range.

In a preferred embodiment of the present invention, the switching control circuit also has an error signal generation circuit into which the voltage of the output capacitor and a constant reference voltage are input and which generates an error signal representing the error between the two voltages, a pulse width control circuit that generates a pulse width control signal indicating the desired ON period for reducing the error in the next cycle, and a switching drive circuit which receives the pulse width control signal from the pulse width control circuit and also receives the ON period upper limit signal indicating the upper limit of the ON period produced by the ON period upper limit control circuit, and which drives the switching element to an on state according to the pulse width control signal when the desired ON period does not exceed the upper limit, and which drives the switching element to an on state according to the ON period upper limit signal when the desired ON period does exceed the upper limit. Preferably, an integration circuit that time-integrates the error signal between the error signal generation circuit and the pulse width control circuit could also be provided.

In a preferred embodiment of the present invention, the pulse width control circuit has a ramp-generation circuit that generates a sawtooth wave or a triangular wave synchronized with the main clock, and a second comparator that compares the error signal and the sawtooth wave or triangular wave, and outputs, as the pulse width control signal, a binary signal that has a first logical value when the voltage level of the error signal is higher than the voltage level of the sawtooth wave or triangular wave, and has a second logical value when the voltage level of the error signal is lower than the voltage level of the sawtooth wave or the triangular wave.

In a preferred embodiment of the present invention, an ON period monitoring circuit is additionally provided that receives the pulse width control signal from the pulse width control circuit and monitors the size relationship between the ideal ON period and the upper limit of the ON period. The ON period upper limit control circuit then makes the upper limit of the ON period in the next cycle larger when no current is flowing toward the output capacitor from the node at the end of the cycle concerned, and the ideal ON period exceeds the ON period upper limit, according to the monitoring result produced by the current-monitoring circuit and the monitoring result produced by the ON period monitoring circuit. In this way the On duty can be increased, and responsiveness to abrupt load change can be increased, while maintaining a discontinuous mode.

In a preferred embodiment of the present invention, the ON period monitoring circuit has a clamp voltage generation circuit that generates a clamp voltage with a predetermined voltage level, a ramp-generation circuit that generates a sawtooth wave or triangular wave synchronized with the main clock, and a third comparator that compares the clamp voltage and the sawtooth wave or triangular wave, and outputs, as an ON period upper limit signal indicating the upper limit of the ON period, a binary signal that has a first logical value when the voltage level of the clamp voltage is higher than the voltage level of the sawtooth wave or triangular wave, and has a second logical value when the voltage level of the clamp voltage is lower than the voltage level of the sawtooth wave or triangular wave. The ON period upper limit control circuit then has a clamp voltage control circuit that controls the clamp voltage generation circuit to vary the voltage level of the clamp voltage signal according to the monitoring result produced by the current-monitoring circuit and the monitoring result produced by the ON period monitoring circuit.

In a preferred embodiment of the present invention, the clamp voltage generation circuit has an up/down counter that counts down when a monitoring result is produced from the current-monitoring circuit that current is still flowing toward the output capacitor from the node at the end of the cycle concerned, and counts up when a monitoring result is produced from the current-monitoring circuit that no such current is flowing at the end of the cycle concerned and a monitoring result is produced from the ON period monitoring circuit that the ideal ON period exceeds its upper limit. The clamp voltage generation circuit also has a digital-analog converter that converts the digital count value output from the up/down counter to an analog voltage signal. The up/down counter holds the count value without counting either down or up when a monitoring result is produced from the current-monitoring circuit that no current is flowing toward the output capacitor from the node at the end of the cycle concerned, and a monitoring result is produced from the ON period monitoring circuit that the ideal ON period does not exceed its upper limit.

In a preferred embodiment of the present invention, the rectifying element is typically a diode, but it can also be replaced with a transistor. That is, it could be controlled synchronized with whether the switching element is on or off, so that when the switching element is on, the transistor is off, and when the switching element is off, the transistor is on.

A DC-DC boost converter in another aspect of the present invention has an inductance element, a switching element connected in series with the inductance element via a node between a direct-current voltage input terminal and a reference potential terminal, a rectifying element connected between the node and an output terminal, an output capacitor connected between the output terminal and a reference potential terminal, and a switching control that divides each cycle regulated by a main clock with a constant frequency into 2 parts, that is, variable ON period and OFF period, and that turns the switching element on during the initial the ON period, and turns the switching element off during the subsequent the OFF period. The switching control has an error signal generation circuit into which the voltage of the output capacitor and a constant reference voltage are input, and which generates an error signal representing the error between the two voltages, a pulse width control circuit which generates a pulse width control signal indicating the desired ON period to make the error smaller in the next cycle according to the error signal from the error signal generation circuit, an ON period monitoring circuit which receives the pulse width control signal generated by the pulse width control circuit and an ON period upper limit signal indicating the desired upper limit and which monitors the size relationship between the desired ON period and the upper limit of the ON period, a switching drive circuit which drives the switching element to an on state according to the pulse width control signal when the desired ON period does not exceed the upper limit of the ON period, and which drives the switching element to an on state according to the ON period upper limit signal when the desired ON period does exceed the upper limit of the ON period according to the monitoring result produced by the ON period monitoring circuit, and an ON period upper limit control circuit which variably controls the upper limit of the ON period in the next cycle according to the monitoring result produced by the ON period monitoring circuit.

DETAILED DESCRIPTION

With the DC-DC boost converter of this invention, the constitution and functioning as described above allows discontinuous mode operation to be maintained efficiently generally without its being subject to the effects of the usage environment or variation in circuit elements, and without the load characteristics or responsiveness being diminished.

A preferred embodiment of the present invention is explained below with reference to FIGS. 1-5.

Figure 1:
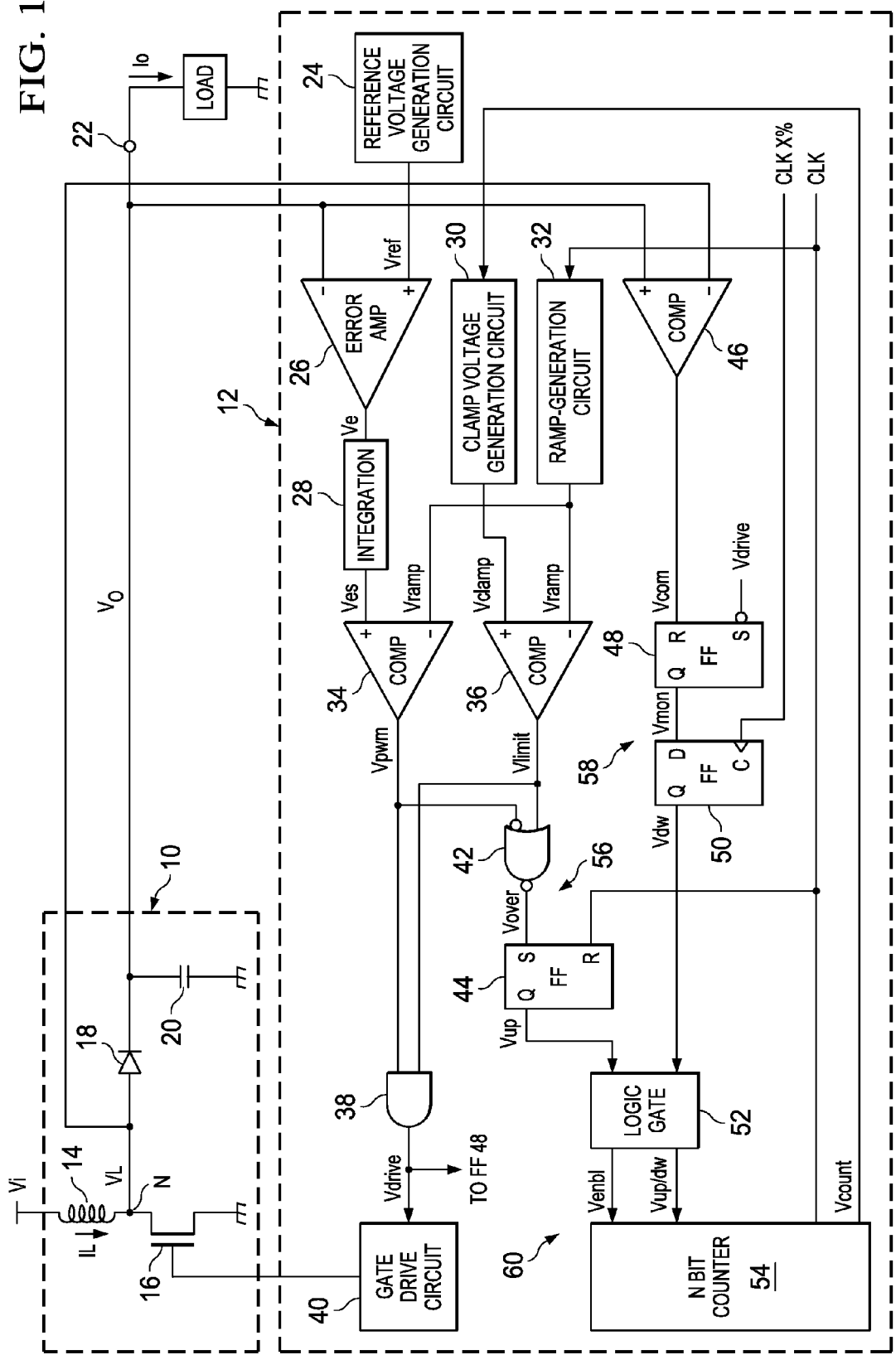
FIG. 1 is a circuit diagram showing the constitution of a DC-DC boost converter (booster) in an embodiment of the present invention.

The configuration of a DC-DC boost converter (booster) in an embodiment of the present invention is shown in FIG. 1. This booster, broadly categorized, is constituted in 2 parts: booster core 10 and control 12.

Booster core 10 is constituted with inductor 14, NMOS transistor 16, diode 18 and output capacitor 20. More specifically, inductor 14 and NMOS transistor 16 are connected in series through node N between an input terminal, to which direct-current input voltage $V_I$ is input, and a ground potential terminal, diode 18 is connected between node N and output terminal 22, and output capacitor 20 is connected between output terminal 22 and the ground potential terminal.

Control 12 has reference voltage generation circuit 24, error amplifier 26, integrator 28, clamp voltage generation circuit 30, ramp (sawtooth wave or triangular wave) generation circuit 32, comparators 34 and 36, AND circuit 38, and gate drive circuit 40 to form a PWM control circuit for matching output voltage $V_O$ obtained by booster core 10 to the desired reference voltage.

Reference voltage generation circuit 24 generates reference voltage $V_{REF}$ with a constant voltage level, and this is supplied to one input terminal (+) of error amplifier 26. Output voltage $V_O$ is output from booster core 10 to the other terminal (−) of error amplifier 26. Error amplifier 26 takes the difference between the two voltages $V_O$ and $V_{REF}$, and outputs as error signal $V_e$, an output voltage corresponding to the error. Error signal $V_E$ is time-integrated by integrator 28, and is supplied to one input terminal (+) of comparator 34 as integrated error signal $V_{ES}$.

Ramp voltage, for example, sawtooth wave $V_{RAMP}$, synchronized with main clock CLK is supplied from ramp-generation circuit 32 to the other terminal (−) of comparator 34. Comparator 34 compares the voltage levels of the two input signals $V_{RAMP}$ and $V_{ES}$, and outputs, as a pulse width control signal or PWM control signal $V_{pwm}$, a binary signal or pulse that is at H level when $V_{RAMP}<V_{ES}$, and at L level when $V_{RAMP}>V_{ES}$. PWM control signal $V_{pwm}$ is supplied to one input terminal of AND circuit 38.

Sawtooth wave $V_{RAMP}$ output from ramp-generation circuit 32 is also supplied to one input terminal (−) of the other comparator 36. Clamp voltage $V_{clamp}$ is input from clamp voltage generation circuit 30 to the other input terminal (+) of comparator 36. Comparator 36 compares the voltage levels of the two input signals $V_{RAMP}$ and $V_{CLAMP}$, and outputs, as ON period upper limit signal $V_{limit}$, a binary signal or pulse that is at H level when $V_{RAMP}<V_{CLAMP}$, and is at L level when $V_{RAMP}>V_{CLAMP}$. Note that clamp voltage $V_{CLAMP}$ output from clamp voltage generation circuit 30 is variably controlled for each cycle of main clock CLK or PWM, as described in detail below.

AND circuit 38 outputs, as switching drive signal $V_{DRIVE}$, a binary signal or pulse that is at H level when both input signals $V_{PWM}$ and $V_{LIMIT}$ are at H level, and that is at L level when one or both are at L level. Here, both input signals $V_{PWM}$ and $V_{LIMIT}$ are synchronized with main clock CLK, so switching drive signal $V_{DRIVE}$ is also synchronized with main clock CLK. Gate drive circuit 40 outputs gate voltage $V_G$ according to switching drive signal $V_{DRIVE}$ from AND circuit 38, and switches NMOS transistor 16 in booster core 10.

In booster core 10, the ON period is when gate voltage $V_G$ is at H level. During this period, NMOS transistor 16 is on, inductance current $I_L$ flows to the ground potential terminal through inductor 14 and NMOS transistor 16 from the voltage input terminal, and electromagnetic energy is stored in inductor 14. The period when gate voltage $V_G$ is at L level is then the OFF period. During this period, NMOS transistor 16 is off, and the electromagnetic energy stored in inductor 14 prior to that is discharged toward output terminal 22. That is, inductance current $I_L$ flows into output capacitor 20 through node N and diode 18 from inductor 14, and output capacitor 20 is charged.

Control 12 in this embodiment has, in addition to a PWM control circuit to match output voltage $V_O$ of booster core 10 to reference voltage $V_{REF}$ as described above, logic gate circuit 42, RS-type flip-flop (FF) 44, comparator 46, RS-type flip-flop (FF) 48, D type flip-flop (FF) 50, logic gate circuit 52, and N bit counter 54, and also uses not only main clock CLK but also secondary clock CLKX %.

Here, logic gate circuit 42 and RS-FF 44 constitute ON period monitoring circuit 56 that monitors whether the pulse width (desired ON period) of PWM control signal $V_{PWM}$ exceeds the pulse width (ON period upper limit) of ON period upper limit signal $V_{LIMIT}$ for each cycle of main clock CLK.

More specifically, PWM control signal $V_{PWM}$ from comparator 34 is input to one input terminal of logic gate circuit 42, while ON period upper limit signal $V_{LIMIT}$ from comparator 36 is also input to the other input terminal. Logic gate circuit 42 is composed of a NOR circuit and an input inversion circuit, and outputs, as over-upper-limit sensed pulse $V_{over}$, a binary signal that is at H level when the pulse width of PWM control signal $V_{PWM}$ exceeds the pulse width of ON period upper limit signal $V_{LIMIT}$, that is, when $V_{PWM}$=H level (logical value "1") and $V_{LIMIT}$=L level (logical value "0"). A table of logic gate circuit 42 true values is shown below.

TABLE 1

| Vpwm | Vlimit | Vover |
|---|---|---|
| 0 | x | L |
| 1 | 0 | H |
| 1 | 1 | L |

With RS-FF 44, over-upper-limit sensed pulse $V_{over}$ from logic gate circuit 42 is input to the set input terminal (S), while main clock CLK is also input to the reset input terminal (R), and a binary signal that will be at H level when $V_{OVER}$=H level (logical value "1") and CLK=L level (logical value "0") is output as count-up instruction signal $V_{UP}$.

Figure 2:
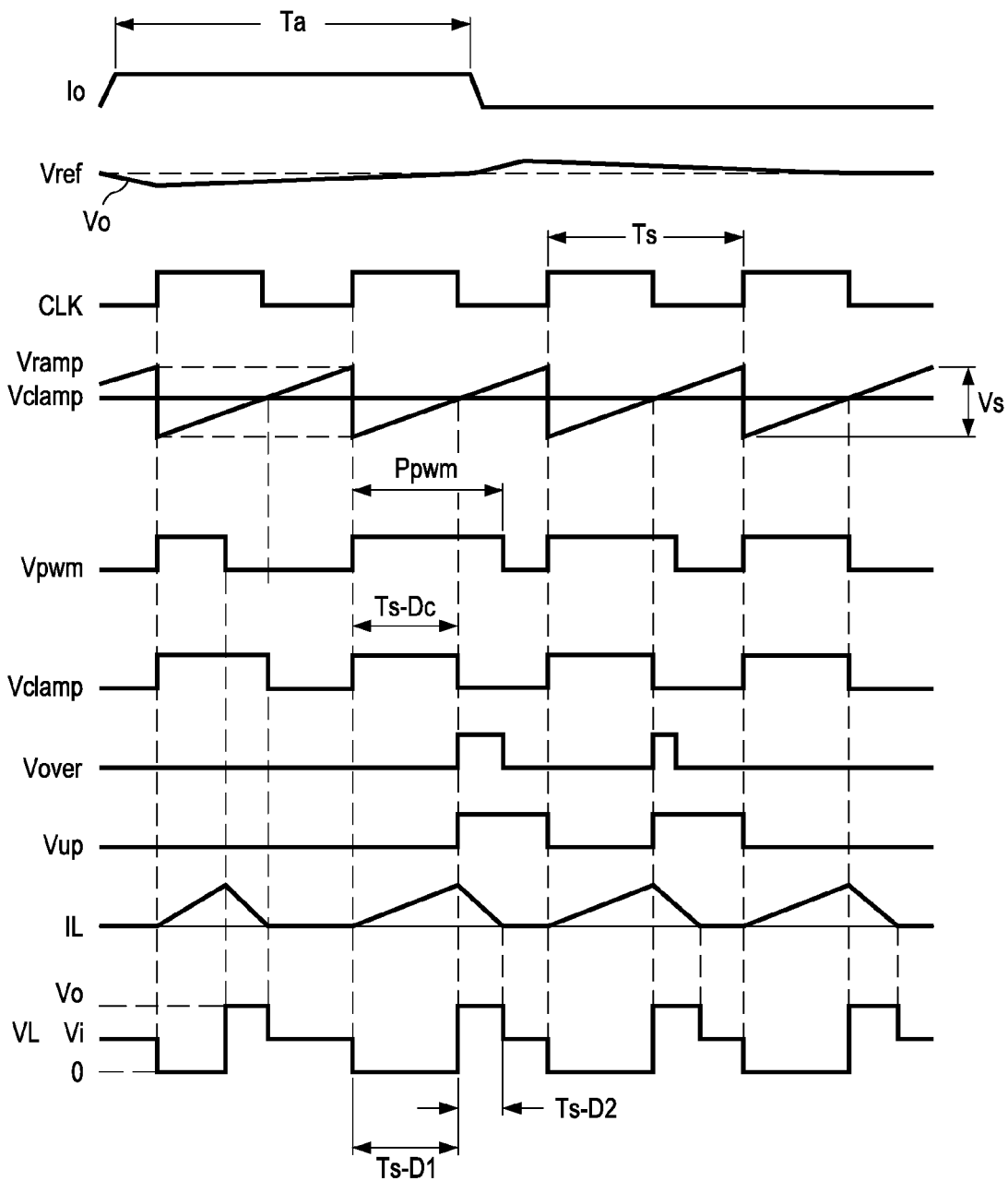
FIG. 2 is a waveform diagram showing the waveforms of the various parts for explaining monitoring operation by the ON period monitoring circuit in the embodiment.

The monitoring operation by ON period monitoring circuit 56 (42, 44) is shown in FIG. 2 with a waveform diagram. In the example illustrated, operation when load current $I_o$ varies in the increasing direction above a steady value across a certain period Ta is shown.

As shown in FIG. 2, when load current $I_o$ varies in the increasing direction, output voltage $V_O$ becomes lower than reference voltage $V_{REF}$, the voltage level of error signal $V_{ES}$ rises because of this, pulse width (H level period) $P_{PWM}$ of PWM control signal $V_{PWM}$ becomes larger, and the ON period (ON period) $T_S \cdot D_1$ of NMOS transistor becomes longer. When ON period $T_S \cdot D_1$ becomes longer, inductance current $I_L$ increases, more energy is supplied from inductor 14 to output capacitor 22, and output voltage $V_O$ rises toward reference voltage $V_{REF}$.

In feedback PWM control such as this, when pulse width $P_{PWM}$ of PWM control signal $V_{PWM}$ does not exceed pulse width $T_S \cdot D_C$ of ON period upper limit signal $V_{LIMIT}$, over-upper-limit sensed pulse $V_{over}$ from logic gate circuit maintains an L level (logical value "0") state, RS-FF 44 remains reset with the rise of clock CLK, and output (Q) count-up instruction signal $V_{UP}$ is held at L level (logical value "0").

However, when pulse width $P_{PWM}$ of PWM control signal $V_{PWM}$ exceeds pulse width $T_S \cdot D_C$ of ON period upper limit signal $V_{LIMIT}$, RS-FF 44 is reset with the timing at which over-upper-limit sensed pulse $V_{over}$ changes from L level to H level, and output (Q) count-up instruction signal $V_{UP}$ is set to H level. Then at the rise of the next clock CLK, RS-FF 44 is reset, and count-up instruction signal $V_{UP}$ is returned to L level.

In this way, ON period monitoring circuit 56 (42, 44) monitors the size relationship between pulse width $P_{PWM}$ of PWM control signal $V_{PWM}$ and pulse width $T_S \cdot D_C$ of ON period upper limit signal $V_{LIMIT}$, and holds count-up instruction signal $V_{UP}$ at L level when $P_{PWM}<T_S \cdot D_C$, and sets count-up instruction signal $V_{UP}$ to H level when $P_{PWM}>T_S \cdot D_C$.

In control 12, comparator 46, RS-FF 48 and D-FF 50 constitute current-monitoring circuit 58 that monitors whether inductance current $I_L$ is still flowing from inductance element 14 toward output capacitor 22 in booster core 10 at the end of each cycle regulated by main clock CLK.

More specifically, one input terminal (+) of comparator 46 is connected to the positive pole terminal of output capacitor 22 or to output terminal 22, and the other input terminal (−) is connected to node N. Comparator 46 compares potential $V_L$ of node N and output voltage $V_O$, and outputs binary signal $V_{COM}$ to be at H level when $V_L<V_O$, and at L level when $V_L>V_O$.

For RS-FF 48, switching drive signal $V_{DRIVE}$ is input from AND circuit 38, with polarity inverted, to the set input terminal (S), output signal $V_{COM}$ from comparator 46 is input to the reset input terminal (R), and a binary signal is output, as monitor signal $V_{MON}$, to be at H level when $V_{DRIVE}$=L level (logical value "0") and $V_{COM}$=L level (logical value "0"). That is, RS-FF 48 is reset when switching drive signal $V_{DRIVE}$ falls from H level to L level, and output (Q) monitor signal $V_{MON}$ rises to H level from the L level prior to that. It is reset when output signal $V_{COM}$ of comparator 46 then changes from L level to H level (that is, when potential $V_L$ of node N becomes lower than output voltage $V_o$), so that output (Q) monitor signal $V_{MON}$ will return to L level from H level.

For D-FF 50, monitor signal $V_{MON}$ from RS-FF 48 is input to the data input terminal (D), while secondary clock CLKX % from the auxiliary clock generation circuit (not shown) is also input to the clock input terminal (C). The rising edge of secondary clock CLKX % is used as the reference point, and binary count-down instruction signal $V_{DW}$ is output so that if monitor signal $V_{MON}$ is at H level (logical value "1") at that point, $V_{DW}$=H level (logical value "1"), and if monitor signal $V_{MON}$ is at L level (logical value "0") at that point, $V_{DW}$=L level (logical value "0").

Note that secondary clock CLKX % has the same frequency as main clock CLK, and the phase is offset by a predetermined value. That is, the rising edge of secondary clock CLKX % could normally be set to within the period of the remaining 10% at the end of the main clock CLK cycle. As a variation, when D-FF 50 latches monitor signal $V_{MON}$ at the falling edge of secondary clock CLKX %, the falling edge of secondary clock CLKX % could be set to the end of the main clock CLK cycle.

Figure 3:
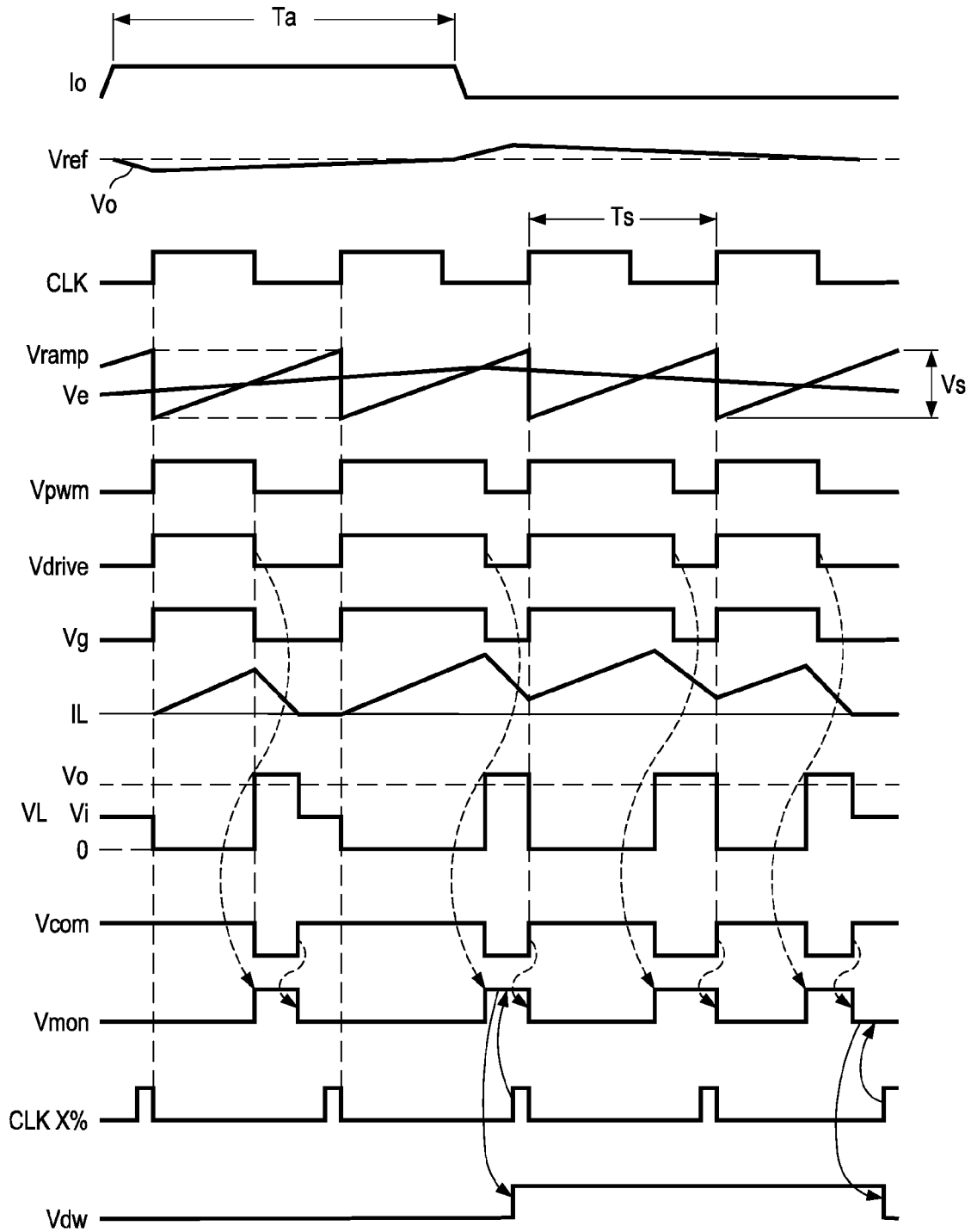
FIG. 3 is a waveform diagram showing the waveforms of the various parts for explaining monitoring operation by the current-monitoring circuit in the embodiment.

Monitoring operation by current-monitoring circuit 58 (46, 48, 50) is shown in FIG. 3 with a waveform diagram. With the example illustrated, operation when load current $I_o$ varies in the increasing direction above a steady value across a certain period $T_a$ is shown.

In FIG. 3, when switching drive signal $V_{DRIVE}$ changes from H level to L level within each cycle of main clock CLK, output (Q) of RS-FF 48, that is, monitor signal $V_{MON}$, changes to H level from the L level prior to that. That is, when switching drive signal $V_{DRIVE}$ changes from H level to L level, an H level signal is input to the set input terminal (S) of RS-FF 48. At the same time, NMOS transistor 16 turns off in booster core 10 and the energy stored in inductor 14 is discharged to output capacitor 20. That is, inductance current $I_L$ flows toward output capacitor 20 through diode 18 from node N. For this reason, potential $V_L$ of node N becomes higher than the voltage of output capacitor 20k, that is, output voltage $V_O$, output signal $V_{COM}$ of comparator 46 changes from H level to L level, and an L level signal is input to the reset input terminal (R) of RS-FF 48. Because of this, RS-FF 48 is set, and monitor signal $V_{MON}$ changes from L level to H level.

After switching drive signal $V_{DRIVE}$ changes from H level to L level in this way, the relationship $V_L > V_O$ continues while inductance current $I_L$ from inductor 14 is flowing to output capacitor 20 through node N and diode 18, so the state where $V_{COM}$=L level and $V_{MON}$=H level is maintained.

Then when inductance current $I_L$ decreases to zero amperes, potential $V_L$ of node N at that point drops instantly to potential $V_I$ of the voltage output terminal, which is lower than output voltage $V_O$, and output signal $V_{COM}$ of comparator 46 changes from L level to H level. Then RS-FF 48 is reset, and monitor signal $V_{MON}$ changes from H level to L level.

When the booster is operating in discontinuous mode, because of the return to $I_L$=0 A before the end of each cycle, monitor signal $V_{MON}$ at data input terminal (D) of D-FF 50 is at L level with the rise of secondary clock CLKX %, and output (Q) count-down instruction signal $V_{DW}$ remains at L level.

However, with a shift from discontinuous mode to continuous mode, because there is no return to $I_L$=0 A even at the end of each cycle, that is, because monitor signal $V_{MON}$ at data input terminal (D) remains at H level, D-FF 50 sets output (Q) count-down instruction signal $V_{DW}$ to H level at the rise of secondary clock CLKX %. Then, this state, that is, the H level state of count-down instruction signal $V_{DW}$, is maintained until there is a return to discontinuous mode from continuous mode.

In this way, current-monitoring circuit 58 (46, 48, 50) monitors whether inductance current $I_L$ is still flowing toward output capacitor 20 from inductance element 14 in booster core 10 at the end of each cycle of main clock CLK, based on secondary clock CLKX %, output voltage $V_O$ and potential $V_L$ of node N in booster core 10, and outputs count-down instruction signal $V_{DW}$ to be at L level when the booster is operating in discontinuous mode, and at H level when operating in continuous mode.

In control 12, logic gate circuit 52 and N bit counter 54 constitute ON period upper limit control circuit 60 that variably controls or calibrates pulse width $T_S \cdot D_C$ of ON period upper limit signal $V_{LIMIT}$ for each cycle of main clock CLK based on the monitoring results produced by ON period monitoring circuit 56 and current-monitoring circuit 58. Clamp voltage generation circuit 30 has a digital-analog (D/A) converter to convert digital clamp voltage signal $V_{COUNT}$ provided by ON period upper limit control circuit 60 to an analog voltage signal (clamp voltage $V_{CLAMP}$).

Count-up instruction signal $V_{UP}$ from ON period monitoring circuit 56 and count-down instruction signal $V_{DW}$ from current-monitoring circuit 58 are input to logic gate circuit 52, and a pair of output signals, that is, count enable signal $V_{ENB}$ and up/down selection signal $V_{UP/DW}$, are output based on the true value table below.

TABLE 2

| Vup | Vdw | Venbl | Vup/dw |
|-----|-----|-------|--------|
| ○ | ○ | L | L |
| 1 | ○ | H | H |
| X | 1 | H | L |

N bit counter 54 receives count enable signal $V_{ENB}$ and up/down selection signal $V_{UP/DW}$ at their respective control input terminals, while main clock CLK is also input to the clock input terminal (CK). Counting down or counting up is selectively performed according to the logic of the two control signals $V_{ENB1}$ and $V_{UP/DW}$, and N bit count value $V_{COUNT}$ is output as a digital clamp voltage signal.

In ON period upper limit control circuit 60, more specifically, when $V_{UP}$=L level (logical value "0") and $V_{DW}$=L level (logical value "0"), $V_{ENB1}$=L level, and only then will N bit counter 54 hold the current count value (value of $V_{COUNT}$) without either counting up or down. When $V_{UP}$=H level (logical value "1") and $V_{DW}$=L level (logical value "0"), $V_{ENB1}$=L level and $V_{UP/DW}$=H level, and N bit counter 54 operates as an up counter and increments the count value (value of $V_{COUNT}$) by 1 (1 step worth) at the rise of main clock CLK. When $V_{DW}$=H level (logical value "1"), N bit counter 54 operates as a down counter regardless of the state of $V_{UP}$, and decrements the count value (value of $V_{COUNT}$) by 1 (1 step worth) at the rise of main clock CLK.

In this way, at each cycle, when a monitoring result is produced from ON period monitoring circuit 56 that pulse width $P_{PWM}$ of PWM control signal $V_{PWM}$ has not exceeded pulse width $T_S \cdot D_C$ of ON period upper limit signal $V_{LIMIT}$, and a monitoring result is produced from current-monitoring circuit 58 that booster core 10 is operating in discontinuous mode, ON period upper limit control circuit 60 continues to hold the value of clamp voltage signal $V_{COUNT}$. Therefore, at the next cycle the voltage level of clamp voltage $V_{CLAMP}$ generated by clamp voltage generation circuit 30 will not change, and thus pulse width $T_S \cdot D_C$ of ON period upper limit signal $V_{LIMIT}$ also will not change.

However, when a monitoring result is produced from ON period monitoring circuit 56 that pulse width $P_{PWM}$ of PWM control signal $V_{PWM}$ has exceeded pulse width $T_S \cdot D_C$ of ON period upper limit signal $V_{LIMIT}$, and a monitoring result is produced from current-monitoring circuit 58 that booster core 10 is operating in discontinuous mode in a given cycle, ON period upper limit control circuit 60 increments the value of clamp voltage signal $V_{COUNT}$ by 1. Then the voltage level of clamp voltage $V_{CLAMP}$ generated by clamp voltage generation circuit 30 rises 1 step at the next cycle, and pulse width $T_S \cdot D_C$ of ON period upper limit signal $V_{LIMIT}$ rises 1 step.

Also, when a monitoring result is produced from current-monitoring circuit 58 that booster core 10 is operating in continuous mode in a given cycle, ON period upper limit control circuit 60 decrements the value of clamp voltage signal $V_{COUNT}$ by 1 regardless of the monitoring result produced by ON period monitoring circuit 56. Then, the voltage level of clamp voltage $V_{CLAMP}$ generated by clamp voltage generation circuit 30 drops 1 step at the next cycle, and pulse width $T_S \cdot D_C$ of ON period upper limit signal $V_{LIMIT}$ decreases 1 step.

PWM control with which the ON period or On duty of booster core 10 can be varied as soon as possible or to the maximum limit (to nearly 100% of the ON period in discontinuous mode) is possible while essentially maintaining discontinuous mode by variably controlling pulse width $T_S \cdot D_C$ of ON period upper limit signal $V_{LIMIT}$ for each cycle of main clock CLK by means of ON period upper limit control circuit 60 as described above.

Figure 4:
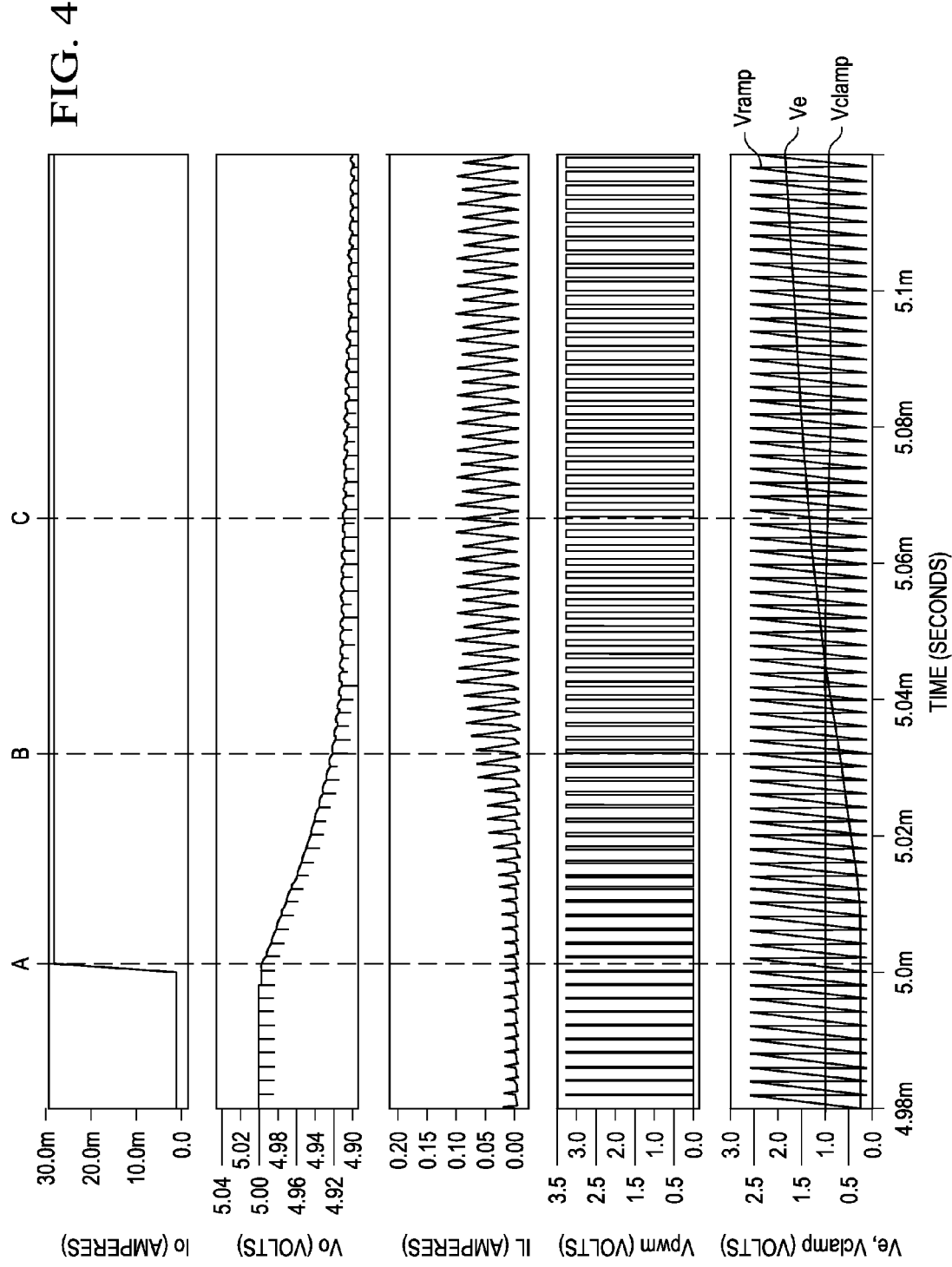
FIG. 4 is a simulated waveform diagram for showing an example of the functioning of the ON period upper limit control circuit in the embodiment.

FIG. 4 illustrates an example of the functioning of ON period upper limit control circuit 60 in this embodiment with simulated waveforms. The example illustrated shows the waveforms of the various parts when load current $I_O$ increases suddenly while the booster is operating in discontinuous mode.

In FIG. 4, when load current $I_O$ increases stepwise at point A, output voltage $V_O$ subsequently drops. Then feedback PWM control by control 12 works as described above, the voltage level of error signal $V_E$ rises, and the pulse width of switching drive signal $V_{DRIVE}$ increases from point A to point B. Nonetheless, at point B, although operation is still in discontinuous mode, the pulse width (ON period or On duty) of switching drive signal $V_{DRIVE}$ increases additionally afterward, and goes to nearly 100% of the ON period duty rate in discontinuous mode. Then at point C it is operating at near the maximum duty (100% of the ON period in discontinuous mode) in discontinuous mode. The interval from point B to point C in FIG. 4 is shown enlarged in FIG. 5.

At an interval a the pulse width of $V_{DRIVE}$ is narrower than the pulse width ($T_S \cdot D_C$) of ON period upper limit signal $V_{LIMIT}$, and there is operation in discontinuous mode, so count-down signal $V_{DW}$ and count-up signal $V_{UP}$ are, respectively, $V_{DW}$=L level and $V_{UP}$=L level. The value of clamp voltage signal $V_{COUNT}$ output from ON period upper limit control circuit 60 does not change, and clamp voltage $V_{CLAMP}$ output from clamp voltage generation circuit 30 is kept at the same value before that (about 1.0 volt).

Figure 5:
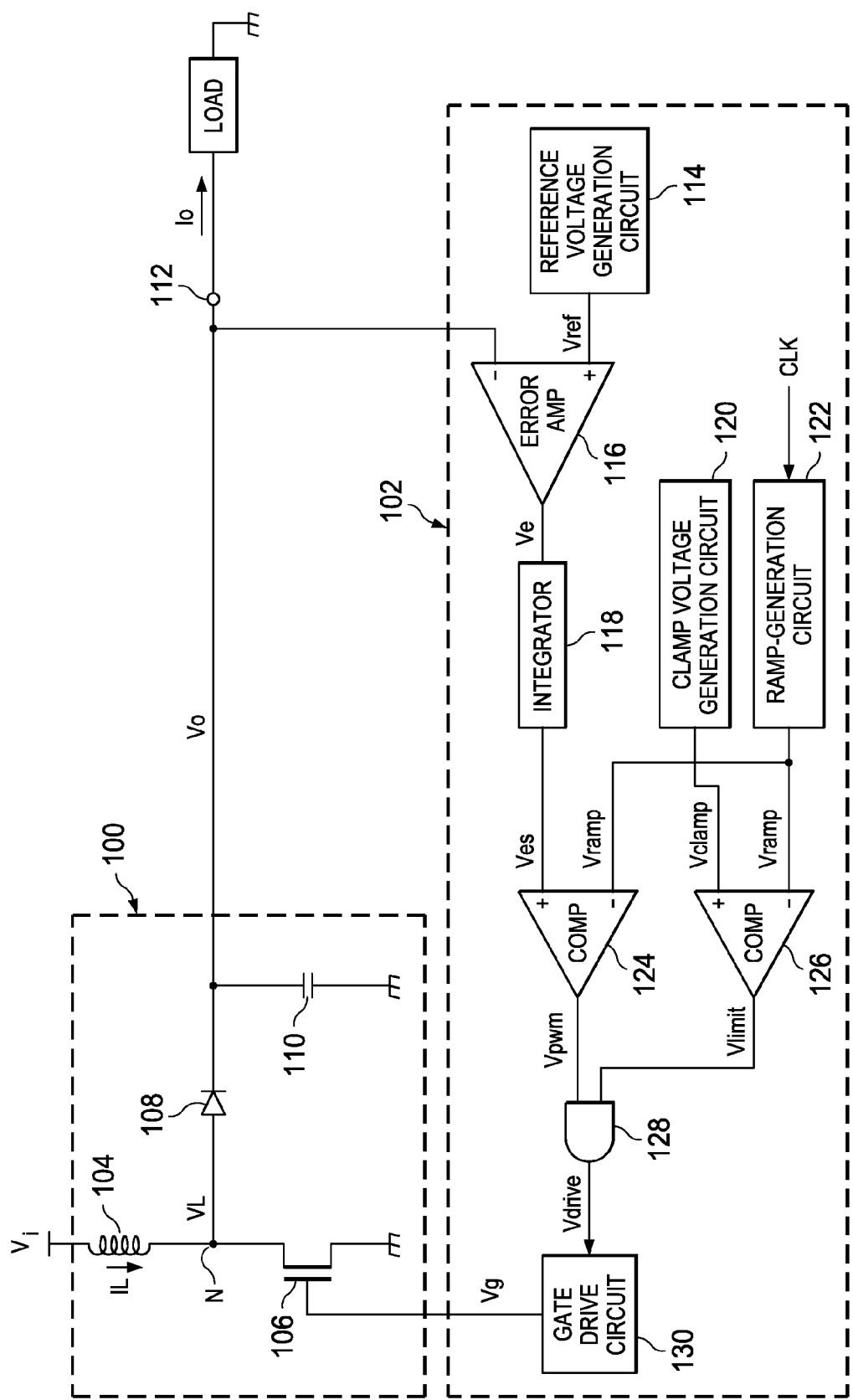
FIG. 5 is a circuit diagram showing the constitution of a conventional representative DC-DC boost converter (booster).
Figure 6:
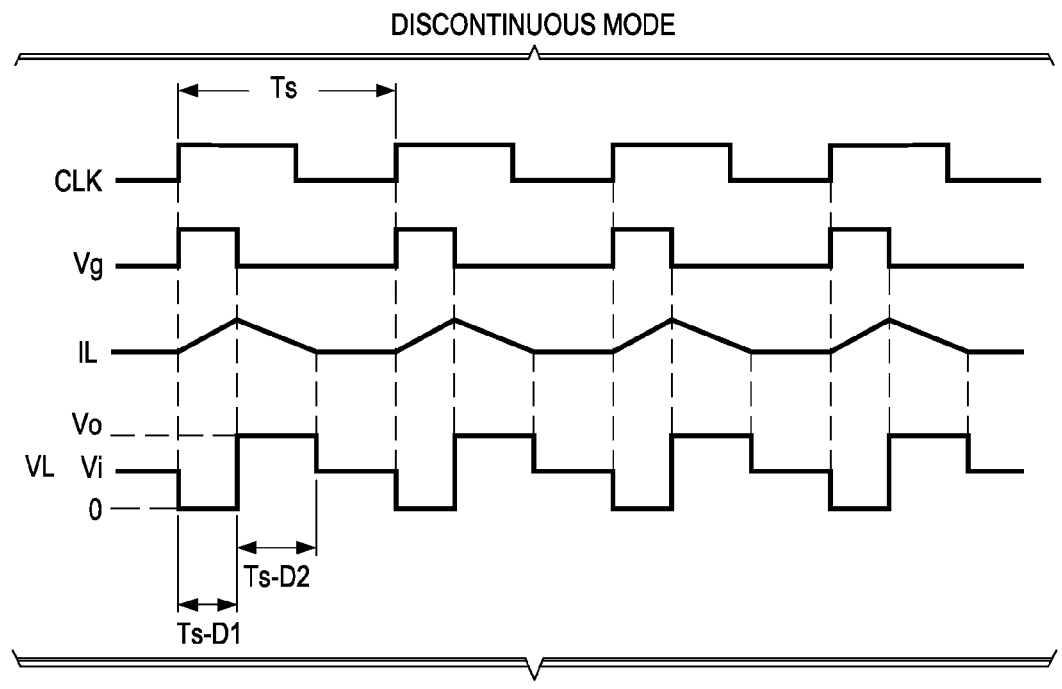
FIG. 6 is a waveform diagram showing the waveforms of the various parts for explaining basic operation of the booster and a discontinuous mode operation state.
Figure 7:
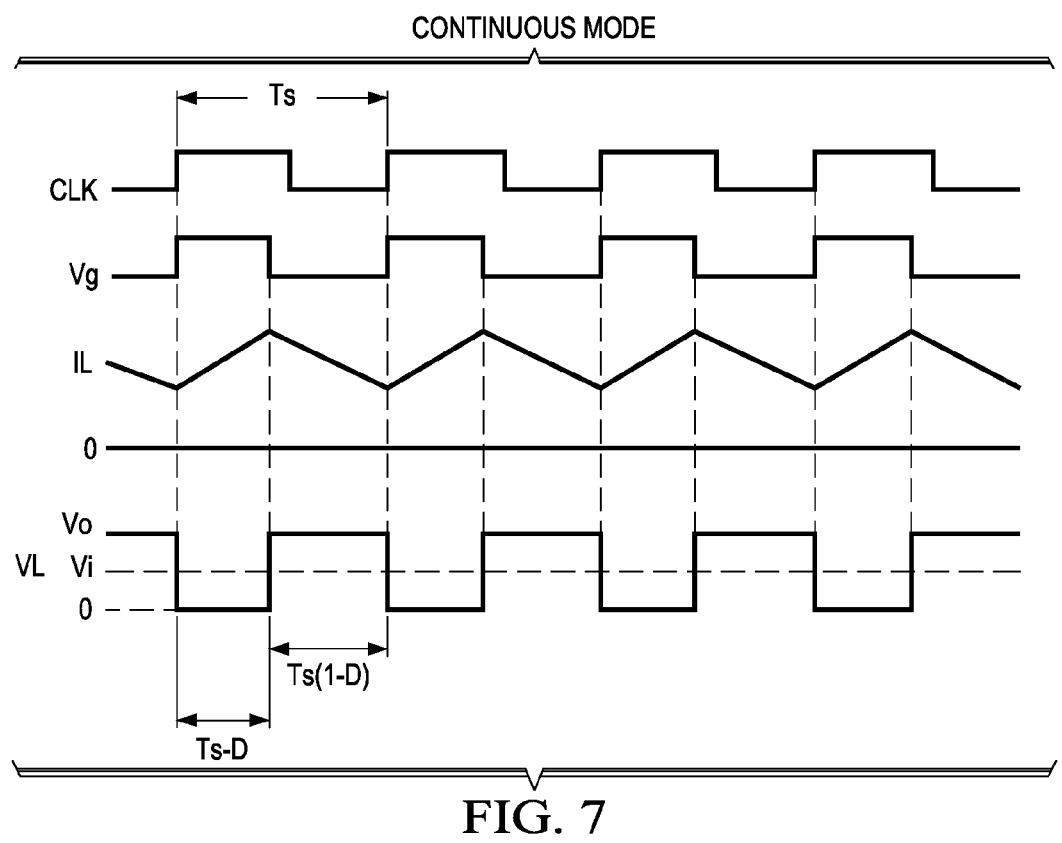
FIG. 7 is a waveform diagram showing the waveforms of the various parts for explaining a booster continuous mode operation state.
Figure 8:
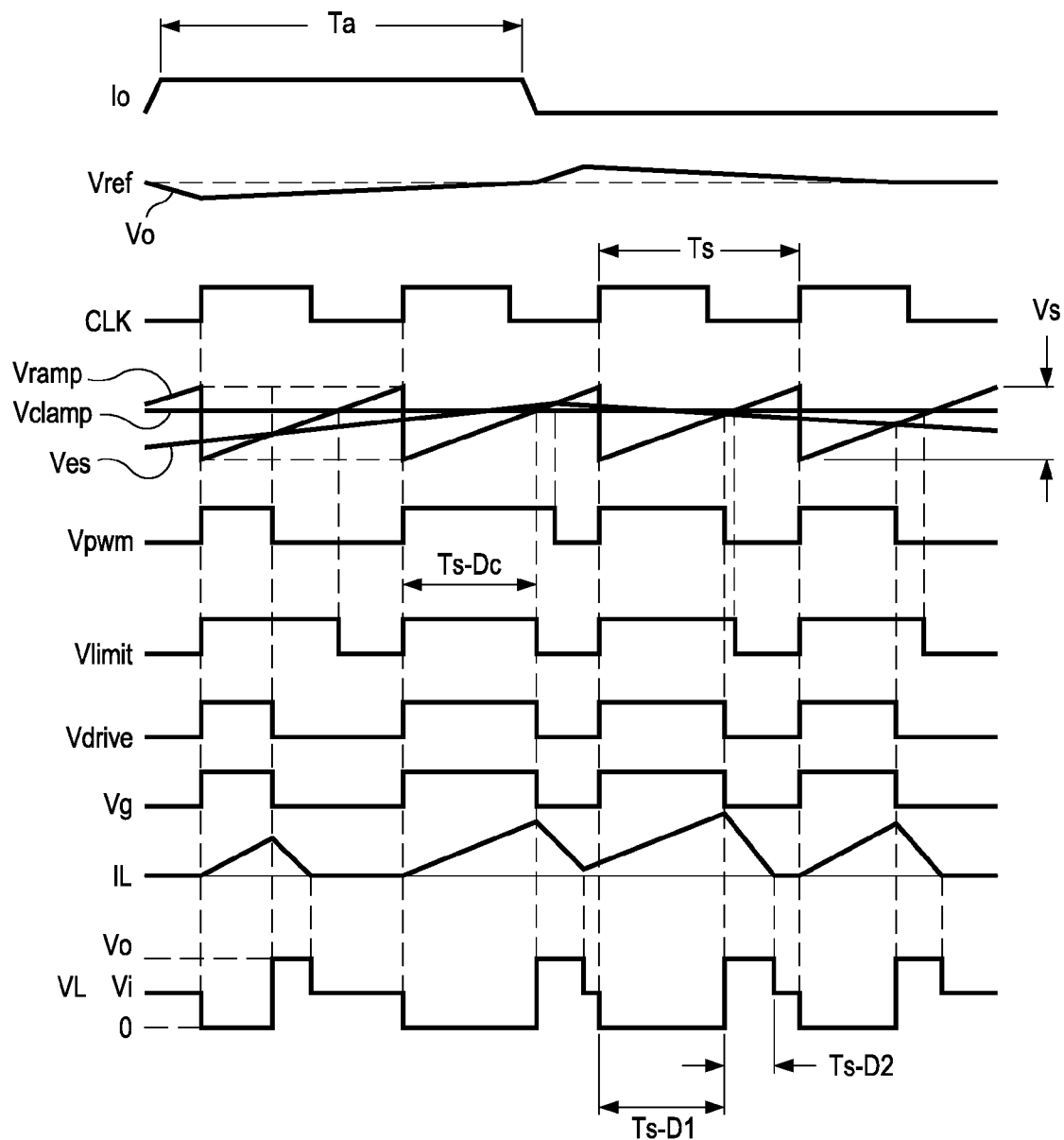
FIG. 8 is a waveform diagram showing the waveforms of the various parts for explaining an example of operation when load current fluctuates in the conventional booster in FIG. 5.

Only the value of the 2 least significant bits [1:0] of clamp voltage signal $V_{COUNT}$ are indicated represented with $V_{COUNT}[1]$ and $V_{COUNT}[0]$. Also, potential $V_L$ of node N at interval a in FIG. 5 is ringing centered on the level of $V_I$ (about 3.0 volts). This is because even though the flow of inductance current $I_L$ is stopped, some energy still remains in inductor 14 and is discharged; there is no effect on operation.

At interval or cycle b, potential $V_L$ of node N is still higher than output voltage $V_O$ at the monitoring point (rising edge of secondary clock CLKX %) set to 95% (5% remaining) of the clock cycle, so a monitoring result is produced from current-monitoring circuit 58 that a shift to continuous mode has occurred ($V_{DW}$=H level). This monitoring result is received, and at the next interval (cycle) c, ON period upper limit control circuit 60 decrements the value of clamp voltage signal $V_{COUNT}$ by 1, that is, reduces the value of the 2 least significant bits from [1:0] to [0:1], and clamp voltage $V_{CLAMP}$ falls to a step one level lower (about 0.95 volt) from the value prior to that (about 1.0 volt) because of this. When clamp voltage $V_{CLAMP}$ falls one step, pulse width $T_S \cdot D_C$ of ON period upper limit signal $V_{LIMIT}$ output from comparator 36 becomes smaller by one step.

Although there is also some time lag until upper limit $T_S \cdot D_C$ of the ON period decreases after ON period upper limit control circuit 60 decrements the value of clamp voltage signal $V_{COUNT}$, a monitoring result is produced from current-monitoring circuit 58 at interval c that continuous mode is in effect, the same as at interval b. The result is that, at the next interval (cycle) d, ON period upper limit control circuit 60 further decrements the value of clamp voltage signal $V_{COUNT}$ by 1, and the value of its least 2 significant bits is reduced from [0:1] to [0:0]. With this, clamp voltage $V_{CLAMP}$ further drops to a level one step lower (about 0.90 volt), and pulse width $T_S \cdot D_C$ of ON period upper limit signal $V_{LIMIT}$ becomes even smaller by one step.

In this way, at interval d, while $V_{UP}$=H level by virtue of the pulse width of switching drive signal $V_{DRIVE}$ effectively being subject to the restriction of upper limit $T_S \cdot D_C$, a monitoring result is produced from current-monitoring circuit 58 that discontinuous mode is in effect from the fact that $V_L < V_O$ at the current monitoring point (the point at 5% remaining in the clock cycle). Because of this, at the next interval (cycle) e, ON period upper limit control circuit 60 increments the value of clamp voltage signal $V_{COUNT}$ by 1, setting the value of its 2 least significant bits to [0:1] from [0:0]. Because of this, clamp voltage $V_{CLAMP}$ rises to a level one step higher (about 0.95 volts), and pulse width $T_S \cdot D_C$ of ON period upper limit signal $V_{LIMIT}$ becomes one step higher.

After this, the state in interval d and the state in interval e are alternately repeated, and operation at an ON duty near 100% of the ON period in discontinuous mode can be continued while essentially maintaining the discontinuous mode. In fact, the On duty upper limit can be stopped near 95%, for example, by adjusting the timing or phase of the monitoring point in current-monitoring circuit 58, that is, the rising edge of secondary clock CLKX %, in a forward direction, and discontinuous mode can be held absolutely reliably.

Figure 9:
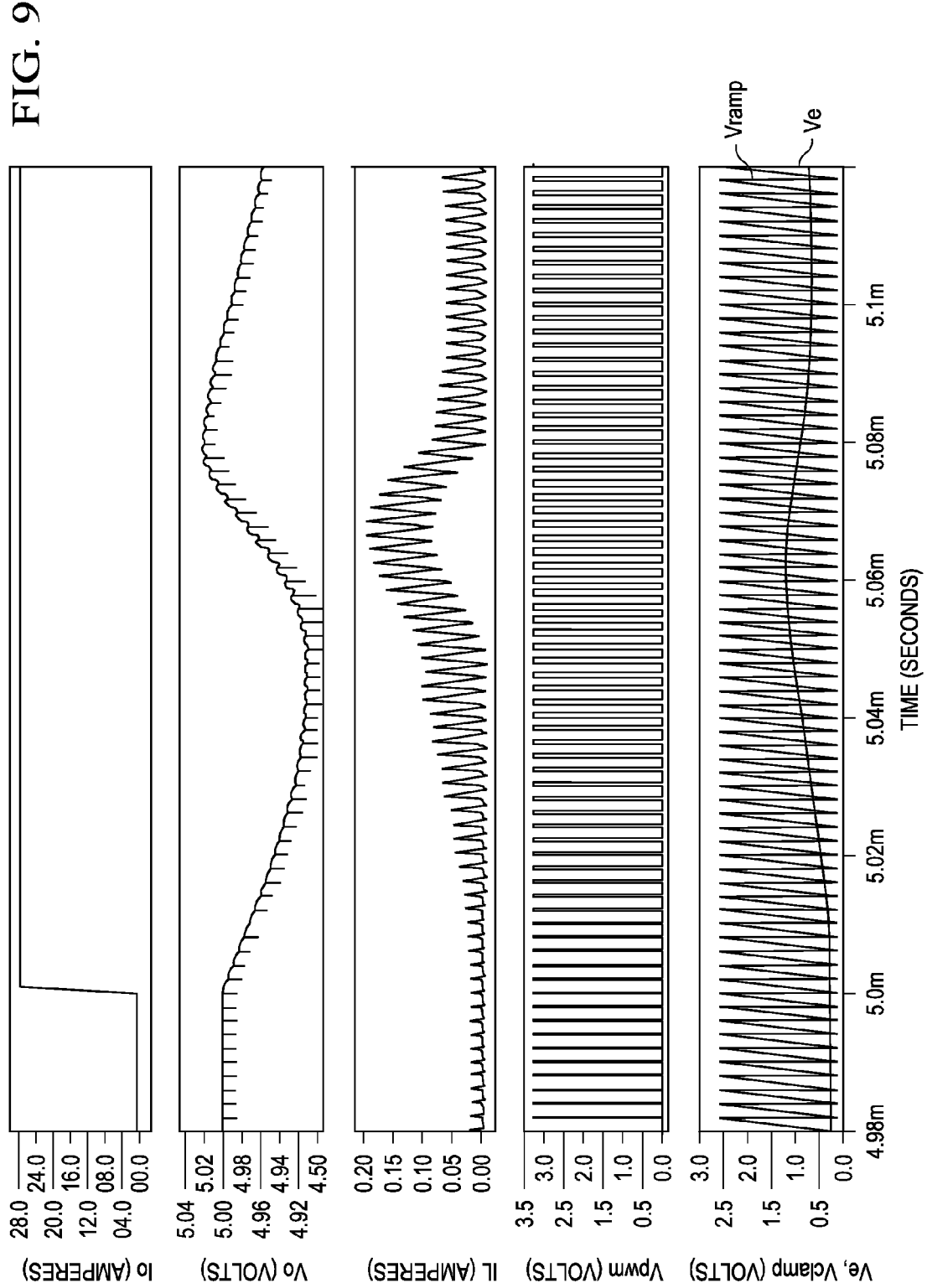
FIG. 9 is a simulated waveform diagram showing an example in which there is a shift from discontinuous mode to continuous operating mode and output voltage becomes unstable with abrupt load change in the conventional booster in FIG. 5.

Because of operating while essentially maintaining a discontinuous mode in this way, as shown in FIG. 4, no ringing as shown in FIG. 9 appears in output voltage $V_O$ and very stable output characteristics are obtained in terms of AC. Note that output voltage $V_O$ ultimately drops to around 4.8 volts as shown in FIG. 4, but this drop is −4% relative to the target voltage (5 volts), and is not a particular problem with normal applications.

As described above, the booster in this embodiment monitors the size relationship between the pulse width of PWM control signal $V_{PWM}$ and pulse width $T_S \cdot D_C$ of ON period upper limit signal $V_{LIMIT}$, with PWM control for matching output voltage $V_O$ of booster core 10 to reference voltage $V_{REF}$ while also monitoring whether there is operation in either continuous mode or discontinuous mode, and variable control is performed as appropriate of the On duty or pulse width of switching drive signal $V_{DRIVE}$ according to the monitoring results. Thus even when the ambient temperature fluctuates or there is variation in the circuit element characteristics in booster core 10, discontinuous mode operation can be maintained stably generally without diminishing load characteristics or responsiveness.

The present invention also has the advantage that shifting to continuous mode can be restricted and discontinuous mode can be maintained even though there is no complicated, large-scale phase compensation circuitry in the booster, where stabilization of operation is complicated and difficult with continuous mode, so that the layout area of the circuitry can be made smaller.

Alternatively, in booster core 10, diode 108 constituting the rectifying element could be replaced with an NMOS transistor. In this case, the rectifying transistor could be turned on and off synchronized with the switching operation of driving switching element 16 complementarily to it or in inverse phase. That is, it could be turned on and off so that when NMOS transistor 16 is on, the rectifying transistor is off, and when NMOS transistor 16 is off, the rectifying transistor is on.

Having thus described the present invention by reference to certain of its preferred embodiments, it is noted that the embodiments disclosed are illustrative rather than limiting in nature and that a wide range of variations, modifications, changes, and substitutions are contemplated in the foregoing disclosure and, in some instances, some features of the present invention may be employed without a corresponding use of the other features. Accordingly, it is appropriate that the appended claims be construed broadly and in a manner consistent with the scope of the invention.

The invention claimed is:

1. A controller for DC-DC boost converter having a switch, comprising:
   an error amplifier that is adapted to receive a feedback signal and that compares the feedback voltage to a reference voltage to generate an error signal;
   a ramp generator that generates a ramp signal;
   a modulator that receives the ramp signal and the error signal and that generates a pulse width modulation (PWM) signal;
   a clamp generator that generates a clamp signal;
   a comparator that receives the ramp signal and a clamp signal and that outputs a limit signal;
   a first logic gate that receives the PWM signal and the limit signal and that outputs a drive signal;
   a second logic gate that receives the PWM signal and the limit signal and that outputs an over-limit signal;
   a gate drive circuit that receives the drive signal and that is adapted to actuate and deactuate the switch;
   a flip-flop that receives the over-limit signal;
   a third logic gate that outputs a count-up signal; and
   a counter that receives a signal from the third logic gate and that outputs a signal to the clamp generator.

2. The controller of claim 1, wherein the flip-flop further comprises an SR flip-flop, wherein the S terminal of the SR flip-flop receives the over-limit signal, and wherein the R terminal of the SR flip-flop receives a second signal from the counter.

3. The controller of claim 1, wherein the first logic gate further comprises an AND gate.

4. The controller of claim 1, wherein the second logic gate further comprises:
   an inverter that receives the PWM signal; and
   a NOR gate that receives an output from the inverter and that receives the over-limit signal.

5. The controller of claim 1, wherein the controller further comprises:
   a second comparator that is adapted to receive the feedback signal and a switching node signal;
   a second flip-flop that receives an output from the second comparator and the drive signal; and
   a third flip-flop that receives an output from the second flip-flop and that outputs a signal to the third logic gate.

6. The controller of claim 5, wherein the second flip-flop is an RS flip-flop.

7. The controller of claim 5, wherein the third flip-flop is a D flip-flop.

8. An apparatus comprising:
   a converter core that generates an output voltage and an output current at an output node, wherein the converter core includes:
      an inductor; and
      a switch that is coupled to the inductor at a switching node; and
      a capacitor that is coupled to the output node;
   a controller including:
      an error amplifier that is coupled to the output node and that compares a feedback voltage from the output node to a reference voltage;
      a ramp generator;
      a modulator that is coupled to the error amplifier and the ramp generator;
      a clamp generator;
      a comparator that is coupled to the ramp generator and to the clamp generator;
      a first logic gate that is coupled to the modulator and to the first comparator;
      a second logic gate that is coupled to the modulator and to the first comparator;
      a gate drive circuit that is coupled to the first logic gate and the switch, wherein the gate drive circuit actuates and deactuates the switch;
      a flip-flop is coupled to the second logic gate;
      a third logic gate is coupled to the flip-flop; and
      a counter is coupled to the third logic gate and the clamp generator.

9. The apparatus of claim 8, wherein the flip-flop further comprises an SR flip-flop, wherein the S terminal of the SR flip-flop is coupled to the second logic gate, and wherein the R terminal of the SR flip-flop is coupled to the counter.

10. The apparatus of claim 8, wherein the first logic gate further comprises an AND gate.

11. The apparatus of claim 8, wherein the second logic gate further comprises:
   an inverter that is coupled to the modulator; and
   a NOR gate that is coupled to the inverter and to the comparator.

12. The apparatus of claim 8, wherein the apparatus further comprises:
   a second comparator is coupled to the switching node and to the output node;
   a second flip-flop is coupled to the first logic gate and the second comparator; and
   a third flip-flop that is coupled to the second flip-flop and the third logic gate.

13. The apparatus of claim 12, wherein the second flip-flop is an RS flip-flop.

14. The apparatus of claim 12, wherein the third flip-flop is a D flip-flop.

* * * * *